(12) United States Patent
Kearney (10) Patent No.: US 9,339,936 B2
(45) Date of Patent: May 17, 2016

(54) DEVICE FOR LIFTING AND POSITIONING AN OBJECT

(71) Applicant: Peter Xavier Kearney, Doernick (DE)

(72) Inventor: Peter Xavier Kearney, Doernick (DE)

(73) Assignee: BDT MEDIA AUTOMATION GMBH, Rottweil (DE)

( * ) Notice: Subject to any disclaimer, the term of this patent is extended or adjusted under 35 U.S.C. 154(b) by 0 days.

(21) Appl. No.: 14/356,612

(22) PCT Filed: Nov. 5, 2012

(86) PCT No.: PCT/EP2012/071791
§ 371 (c)(1),
(2) Date: May 7, 2014

(87) PCT Pub. No.: WO2013/068307
PCT Pub. Date: May 16, 2013

(65) Prior Publication Data
US 2015/0061309 A1 Mar. 5, 2015

(30) Foreign Application Priority Data
Nov. 7, 2011 (DE) ...................... 20 2011 107 531 U (51) Int. Cl.
*B25J 15/06* (2006.01)
*B65G 47/91* (2006.01)
*B66C 1/02* (2006.01)
*B65H 3/08* (2006.01)

(52) U.S. Cl.
CPC ............ *B25J 15/0616* (2013.01); *B65G 47/91* (2013.01); *B65H 3/0816* (2013.01); *B66C 1/0212* (2013.01); *B65H 2404/5213* (2013.01); *B65H 2404/5311* (2013.01); *B65H 2406/36625* (2013.01); *B65H 2511/214* (2013.01); *B65H 2515/212* (2013.01)

(58) Field of Classification Search
CPC .. B25J 15/0616; B25J 15/0683; B65G 47/91; B66C 1/0212; B66C 1/0262; B65H 3/0816; B65H 2404/5213; B65H 2404/52131; B65H 2404/5311; B65H 2406/36625; B65H 2511/214; B65H 2515/212
USPC ................................. 294/183, 64.3, 188, 189
See application file for complete search history.

(56) References Cited

U.S. PATENT DOCUMENTS

| | | | |
|---|---|---|---|
| 3,796,455 A | 3/1974 | Linkbom | |
| 4,389,064 A * | 6/1983 | Laverriere | .................... 294/188 |
| 5,192,070 A * | 3/1993 | Nagai et al. | .................... 271/90 |
| 6,131,973 A | 10/2000 | Trudeau et al. | |
| 6,254,155 B1 * | 7/2001 | Kassir | .......................... 294/185 |
| 6,565,321 B1 | 5/2003 | Illingworth et al. | |

(Continued)

FOREIGN PATENT DOCUMENTS

| | | |
|---|---|---|
| DE | 2330204 A1 | 1/1975 |
| EP | 2361860 A2 | 8/2011 |

(Continued)

*Primary Examiner* — Dean Kramer
(74) *Attorney, Agent, or Firm* — Leydig, Voit & Mayer, Ltd.

(57) ABSTRACT

A device for lifting and positioning an object generates a low pressure by a whirlwind for suctioning the object. The device includes a housing having a suction opening. The housing has at least one friction element which at least partly covers the suction opening. The friction element can have a three-dimensional structure. The device can facilitate handling of objects having a curved shape or rough surface.

29 Claims, 10 Drawing Sheets

(56) References Cited

U.S. PATENT DOCUMENTS

| | | |
|---|---|---|
| 2003/0021687 A1 | 1/2003 | Illingworth et al. |
| 2004/0207219 A1 | 10/2004 | Schmierer et al. |
| 2004/0212205 A1* | 10/2004 | Linker et al. ............... 294/64.1 |
| 2007/0198027 A1 | 8/2007 | Morch |
| 2008/0093371 A1* | 4/2008 | Ubidia et al. .................... 221/1 |
| 2009/0097953 A1* | 4/2009 | Brugger et al. ............... 414/627 |
| 2011/0056804 A1 | 3/2011 | Kearney et al. |
| 2011/0272877 A1 | 11/2011 | Wardak et al. |
| 2012/0086163 A1 | 4/2012 | Wardak et al. |
| 2014/0318929 A1 | 10/2014 | Kearney et al. |

FOREIGN PATENT DOCUMENTS

| | | |
|---|---|---|
| FR | 2709478 A1 | 3/1995 |
| GB | 966957 A | 8/1964 |

* cited by examiner

DEVICE FOR LIFTING AND POSITIONING AN OBJECT

CROSS-REFERENCE TO PRIOR APPLICATIONS

This application is a U.S. National Phase Application under 35 U.S.C. §371 of International Application No. PCT/EP2012/071791 filed on Nov. 5, 2012, and claims benefit to German Patent Application No. DE 20 2011 107 531.5 filed on Nov. 7, 2011. The International Application was published in German on May 16, 2013 as WO 2013/068307 A1 under PCT Article 21(2).

FIELD

The invention relates to a device for lifting and positioning an object.

BACKGROUND

Devices for spatially lifting and positioning an object are known which are based on suction heads, for example resilient suction cups which are connected to a pump or the like in order to be able to hold the object by means of the suction head, due to low pressure and friction and to be able to spatially move the object as desired, suspended from the suction head. Particularly in the case of relatively large or flat articles, such as plastics films, metal sheets or paper, a plurality of suction heads is usually required in order to be able to hold the object during movement. During the movement, a relative movement between object and suction head must be reliably avoided in order to be able to allow an exact positioning of the object after the movement.

When the known suction heads are used for geometrically deformed objects, objects having a rough surface or objects which are oily, dirty or soiled in another manner, there is the risk that the suction heads will quickly lose contact with the object and the object will fall from the suction head. There is the further risk that when known suction heads are used, during an inclined spatial movement, the objects will peel off from the suction heads due to the movement and will fall.

Furthermore, to handle objects, particularly flat objects, devices are known in which a whirlwind is generated inside a generally cylindrical housing, which whirlwind generates a low pressure which can attract objects. Devices of this type are also known as vortex attractors. U.S. Pat. No. 6,565,321 describes a vortex attractor which comprises an impeller with a plurality of radially arranged blades for generating a whirlwind. The whirlwind produces a low pressure which can be used to attract and hold an object.

SUMMARY

In an embodiment, the present invention provides a device for lifting and positioning an object. The device includes first means for generating a low pressure by a whirlwind for suctioning the object. The first means are arranged inside a housing having a suction opening. The housing has at least one friction element which at least partly covers the suction opening.

BRIEF DESCRIPTION OF THE DRAWINGS

The present invention will be described in even greater detail below based on the exemplary figures. The invention is not limited to the exemplary embodiments. All features described and/or illustrated herein can be used alone or combined in different combinations in embodiments of the invention. In the figures, the same reference numerals denote identical or functionally identical components and, to improve clarity, not all the reference numerals have been provided in all the figures. The features and advantages of various embodiments of the present invention will become apparent by reading the following detailed description with reference to the attached drawings which illustrate the following:

FIG. 27e shows the two screen elements according to FIGS. 27a and 27b in a third relative position, FIG. 28 schematically shows a longitudinal section through an embodiment of a device for lifting and positioning an object with first means for generating a low pressure and second means for varying the low pressure and being configured as a second impeller for generating a blowing wind, FIG. 29 schematically shows a longitudinal section through a further embodiment of a device for lifting and positioning an object with first means for generating a low pressure and second means for varying the low pressure and being configured as a further impeller with an electromagnetic brake, FIG. 30b is an exploded view of the device according to FIG. 30a, FIG. 30c is a plan view of the device according to FIG. 30b, FIG. 31a schematically shows a longitudinal section through a further embodiment of a device for lifting and positioning an object with first means for generating a low pressure and second means for varying the low pressure configured as a slide, with the slide in an open position and with an illustration of the generated air flows.

DETAILED DESCRIPTION

The present invention recognizes that known vortex attractors can also suffer from the problem, in addition to the problems mentioned above, that objects having a curved shape or a rough surface move relative to the device during the lifting or holding procedure, thereby preventing an exact positioning of the object.

In an embodiment, the present invention provides a device for lifting and positioning an object which allows the object to be positioned in the best possible manner.

The device according to an embodiment of the invention for lifting and positioning an object comprises first means for generating a low pressure by a whirlwind for suctioning the object, said first means being arranged inside a housing having a suction opening. The housing has at least one friction element which at least partly covers the suction opening.

The friction element increases the friction between the object and the device for lifting and positioning the object in order to avoid an accidental relative movement between the object and the device.

The friction element particularly preferably covers less than 60% of the surface of the suction opening to impair as little as possible the formation of the low pressure by the whirlwind in front of the suction opening.

The friction element preferably has a height which is less than 4% of the diameter of the suction opening to impair as little as possible the formation of the low pressure by the whirlwind in front of the suction opening.

According to a preferred embodiment, the friction element is resilient and produced, for example, from rubber to also allow contact with geometrically deformed objects in the most reliable manner possible.

The friction element preferably has an axially symmetric or point symmetric shape which allows a simple and economical production method.

The friction element is preferably configured as a grid to allow a uniform formation of the low pressure in front of the suction opening.

According to a preferred embodiment of the invention, the friction element has at least one annular element which is preferably arranged concentrically in front of or in the suction opening.

The friction element preferably has a round element which is preferably arranged concentrically in or in front of the suction opening.

According to a particularly preferred embodiment of the invention, the friction element has a three-dimensional structure by which a particularly effective contact with geometrically deformed, uneven, rough or soiled objects is also possible.

The friction element is preferably configured to undulate and preferably has concentric undulations, which also allows good contact with geometrically deformed, uneven, rough or soiled objects.

According to a preferred embodiment of the invention, the friction element has structural elements, such as ribs, indentations and/or knobs, said structural elements preferably being arranged in a pattern to thereby allow increased friction between the device for lifting or positioning the object and the object itself.

According to a preferred development of the invention, the friction element has a perforated surface, thereby promoting a uniform development of the low pressure in front of the suction opening.

According to a preferred embodiment of the invention, the friction element is produced from at least two different materials having different friction coefficients and/or different surface structures and/or different patterns and/or different transmittances so that the friction element can be adapted as favourably as possible to different objects.

According to an advantageous embodiment of the invention, two friction elements are provided and at least one of the friction elements can be varied in its position along the longitudinal axis of the whirlwind to allow contact with differently formed objects and in particular to be able to compensate tolerances.

The friction element preferably has an annular element and a round element, said annular element being arranged axially offset relative to the round element in the direction of the longitudinal axis of the whirlwind.

The annular element and the round element are advantageously arranged such that they overlap in the radial direction.

According to a particularly preferred embodiment of the invention, the friction element is arranged on the housing by means of a resilient element to thereby allow the best possible contact with differently formed objects or, if necessary, to be able to compensate tolerances.

The friction element is preferably configured to be air-permeable in order to impair as little as possible the formation of the low pressure in front of the suction opening.

According to a preferred embodiment, two friction elements are provided, said two elements being arranged in a variable manner in their spacing relative to one another and/or in their spacing relative to the housing to thereby allow the most favourable adaptation to different surface structures.

An alternative device according to the invention for lifting and positioning an object, said device comprising first means for generating a low pressure by a whirlwind for suctioning the object, said first means being arranged inside a housing having a suction opening, the whirlwind generating a low pressure in front of the suction opening, is characterised in that the device has second means for varying the low pressure in front of the suction opening. It is thereby possible to adapt the low pressure to the appropriate object and to the planned movement of the object so that in particular an undesirable relative movement between the object and the device for lifting and positioning the object can be avoided and furthermore a more effective control of the movement of the object is allowed.

According to a preferred embodiment of the invention, the second means are configured such that they at least partly cover the suction opening and are preferably configured as a slide or as an iris diaphragm. In this manner, the surface of the suction opening can be at least partly or completely covered in a simple manner, which entails a corresponding reduction in the low pressure formed in front of the suction opening.

According to a preferred embodiment, the second means have a first element with open and closed surfaces and a second element with open and closed surfaces which are arranged relative to one another in front of the suction opening such that, depending on the relative position of the first element and of the second element, the covered surface of the suction opening is variable, to thus vary the covered surface of the suction opening and thereby the low pressure generated in front of the suction opening simply by rotating the two elements relative to one another.

According to an advantageous development of the invention, the second means are configured as a brake for the first means, preferably as an electromagnetic brake in order to be able to form a slower whirlwind and thereby a reduced low pressure by reducing the speed of the first means.

According to an advantageous embodiment of the invention, the first means are configured as a first impeller and the second means are configured as a second impeller, said second impeller being arranged coaxially to the first impeller, only the first impeller being driven by a motor and the second impeller having an electromagnetic brake.

According to a preferred embodiment of the invention, the second means are configured to generate a blowing wind which counteracts the whirlwind to thereby make it possible to counteract the low pressure, generated by the whirlwind, by providing an excess pressure and to be able to control the force acting on the object.

According to a preferred embodiment of the invention, the first means and the second means are configured as a first impeller and as a second impeller, the second impeller being arranged coaxially to the first impeller on the side of the first impeller opposite the suction opening, a dividing wall being arranged between the first impeller and the second impeller, a housing being arranged around the second impeller which is concentric to the housing of the first impeller and has a greater diameter than the housing of the first impeller. The second impeller generates in this manner a regulatable air flow which in particular counteracts the whirlwind, as a result of which the force acting on the object can be varied.

The first means are preferably configured as a first impeller to thus be able to generate a whirlwind in a simple and economical manner.

The impeller preferably has an impeller wheel and an impeller housing, said impeller wheel being movable relative to the impeller housing in the direction of the axis of rotation, thereby providing a further possibility of regulating the low pressure generated by the whirlwind.

A controller for controlling the first means and/or the second means is preferably provided, preferably for controlling, connecting, disconnecting, decelerating and/or accelerating the first and/or second means, preferably if the first means and/or the second means are configured as an impeller. As a result, in particular the rotational speed of the first and/or second means can be adjusted, to be able to easily control the low pressures generated by the means.

Figures 1, 2, 3:
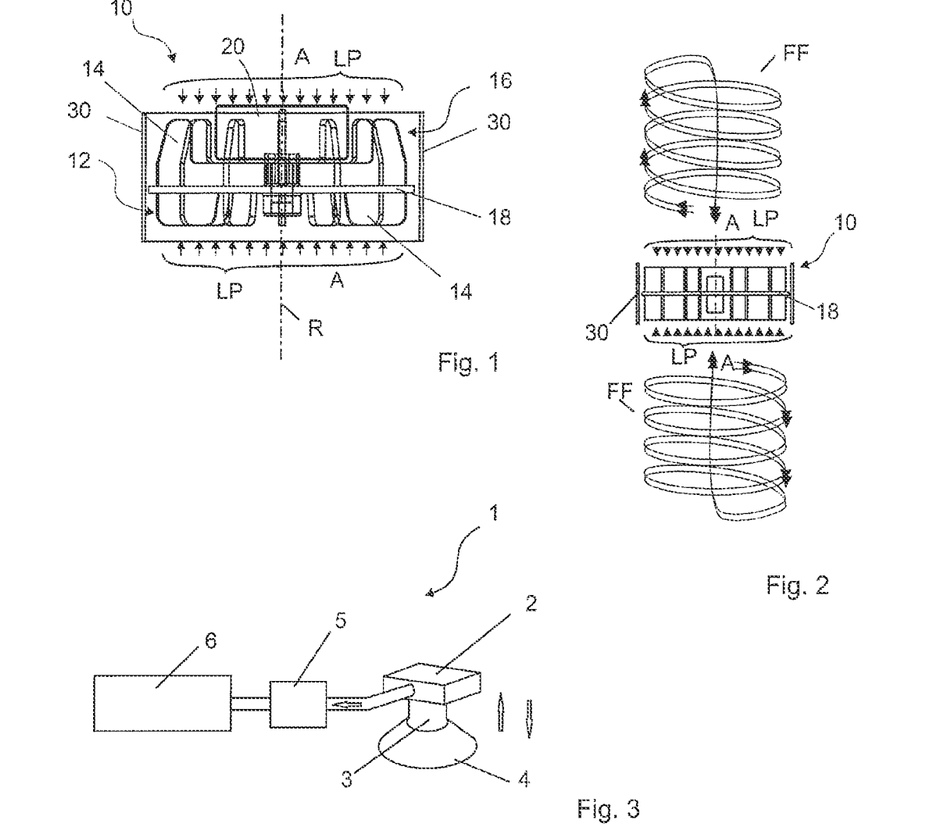
FIG. 1 is a side view of an embodiment of a vortex attractor.
FIG. 2 is a schematic illustration of the air flows generated by a vortex attractor according to FIG. 1.
FIG. 3 is a schematic illustration of an embodiment of a device for lifting and positioning an object.

FIGS. 1 and 2 show a vortex attractor 10 with a lower impeller 12 which is driven by a motor 20. The lower impeller 12 has a dividing element 18, driven by the motor 20, and has a plurality of blades 14 which extend radially on the dividing element 18 and are arranged substantially vertically thereon. The blades 14 rotate about a rotational axis R. In an embodiment, a similarly configured upper impeller 16 with blades 14 is provided on the opposite side of the dividing element 18. In an embodiment, one of the two impellers 12, 16, preferably the upper impeller 16 is used to cool the motor 20. The dividing element 18 can be arranged symmetrically between the upper impeller 16 and the lower impeller 12, but in one embodiment, the upper impeller 16 for cooling the motor 20 is preferably not as high as the lower impeller 12 which provides the low pressure for suctioning an object. In particular, in an embodiment, the vortex attractor 10 only has the lower impeller 12 for generating a low pressure by means of a whirlwind. In this respect, in particular an attractive force A is exerted on an object (not shown). The motor 20 can be a DC motor or an AC motor. For example, the motor 20 is configured as a brushless DC motor or as a stepper motor.

The blades 14 can have various forms and can be bent in the shape of a shovel, for example. However, in one embodiment, the blades 14 are substantially straight and flat and are arranged radially in particular. This measure allows the impellers 12, 16 to rotate in both directions.

In a further embodiment, the blades 14 of the upper impeller 16 can have a recess in an upper, inner and radially extending region in which the motor 20, for example, can be arranged. Alternatively, the motor can naturally also be arranged outside the upper impeller 16.

The vortex attractor 10 can have a housing 30 which is arranged around the outer edges of the dividing wall 18, if this dividing wall 18 is present, and around the outer edges of the blades 14. The housing 30 can be configured as a shell or ring which is formed separately from the blades 14 to provide a particularly light impeller wheel. Alternatively, impeller 12 and/or impeller 16 can also be configured such that a ring which forms the housing 30 is arranged directly on the outer edges of the blades 14.

Basically any device which generates a whirlwind FF can be considered as the vortex attractor 10. The particularly radially extending blades 14 generate the air flow FF which is formed particularly in the manner of a whirlwind and generates a low pressure region LP in front of the impeller 12. The vertical air flow has an axis of rotation which coincides in particular with the axis of rotation R of the blades 14. The attractive force A is generated in the low pressure region LP, which force allows the vortex attractor 10 to attract an object and/or allows it to be moved towards the surface of an object if the vortex attractor 10 is not fixed in its position. Vortex attractors 10 are particularly capable of engaging on planar and also on non-planar surfaces of objects and, if appropriate, are capable of spatially moving the object.

In an embodiment, the upper impeller 16 and the lower impeller 12 are produced from light material, such as plastics material, and preferably have a diameter of approximately 50 mm.

FIG. 3 shows the schematic construction of an embodiment of a device 1 for lifting and positioning an object, comprising first means 2 for generating a low pressure by a whirlwind for suctioning an object. The first means 2 can be configured as a vortex attractor 10 according to one of the embodiments described in the present application.

In this respect, the first means 2 are arranged in a housing 3 which has a substantially round suction opening 4. The suction opening 4 can be directly connected to a cylindrical housing 3. Alternatively, the suction opening 4 can also be configured in a conically widening element which is connected to the housing 3. Connected to the first means 2 is a mechanism 5 which is merely shown schematically and by which the device 1 can be moved spatially. Furthermore, the device 1 is connected to a control unit 6 which controls and regulates the first means 2 and also the mechanism 5 and optionally further components of the device 1 described in the following.

In an embodiment, arranged in front of the suction opening 4 is at least one friction element which can be configured as described in the following, particularly with reference to FIGS. 4 to 16 and 26, which allows a more effective adhesion between the object and the suction opening 4 to prevent undesirable relative movements between the object and the suction opening 4.

Figure 4A:
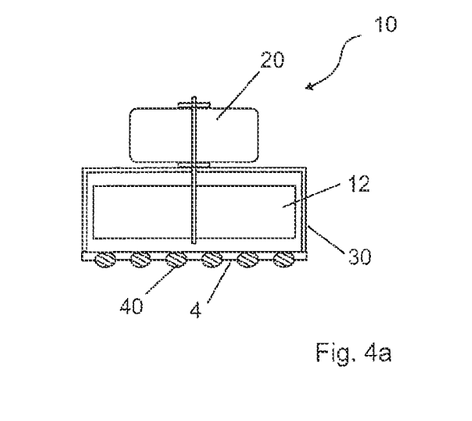
FIG. 4a is an axial sectional view through a vortex attractor having a friction element in a first embodiment.
Figure 4B:
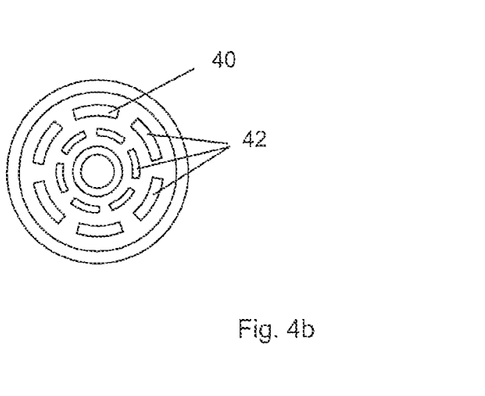
FIG. 4b is a plan view of the friction element of the vortex attractor according to FIG. 4a, FIG. 5 is an axial sectional view through a vortex attractor having a friction element according to a second embodiment.

FIG. 4a shows a longitudinal section through, and FIG. 4b shows a plan view of a vortex attractor 10 which has in its housing 30 only one impeller 12, the motor 20 being arranged above the housing 30, axially offset and preferably concentrically to the impeller 12. The housing 30 is cylindrical and is closed on one side, while the other side is open and forms the suction opening 4. Arranged in front of the suction opening 4 is a first friction element 40, formed from a plurality of ring segment-shaped portions 42 of a plurality of rings arranged concentrically to one another.

Figure 5:
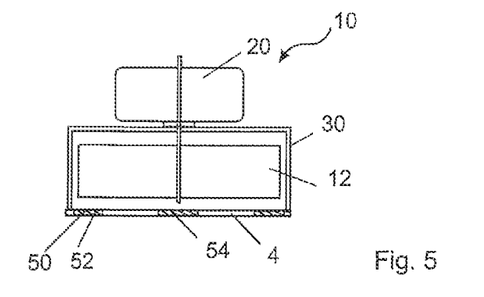

FIG. 5 shows a longitudinal section through the vortex attractor 10 with a second friction element 50 which has an annular element 52, running around the edge of the suction opening 4 and a round element 54 which is arranged concentrically thereto, preferably in the same plane.

Figure 6:
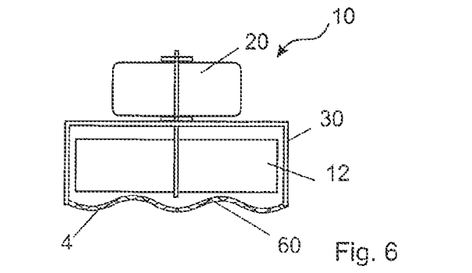
FIG. 6 is an axial sectional view through a vortex attractor having a friction element according to a third embodiment.

FIG. 6 shows a longitudinal section through the vortex attractor 10 with a third friction element 60 which has a three-dimensional structure. The friction element 60 is configured to undulate in particular and has undulations arranged concentrically to one another, for example. The amplitude of the undulations runs particularly parallel to the rotational axis R of the impeller 12.

Figure 7:
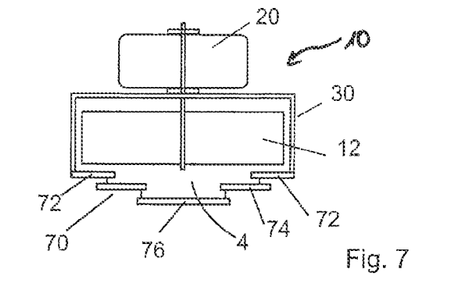
FIG. 7 is an axial sectional view through a vortex attractor having a friction element according to a fourth embodiment.

FIG. 7 shows a longitudinal section through the vortex attractor 10 with a fourth friction element 70 which also has a three-dimensional structure. The fourth friction element 70 has a peripheral ring 72 arranged on the edge of the suction opening 4 as well as a further annular element 74 having an external diameter smaller than the internal diameter of the annular element 72, but having an internal diameter greater than the internal diameter of the annular element 72, and a round element 76 having an external diameter greater than the internal diameter of the annular element 74. The round element 76 and the annular elements 74, 72 are associated coaxially with one another, such that the annular element 74 is arranged between the round element 76 and the annular element 72 axially offset relative to the annular element 72 and axially offset relative to the round element 76.

Figure 8:
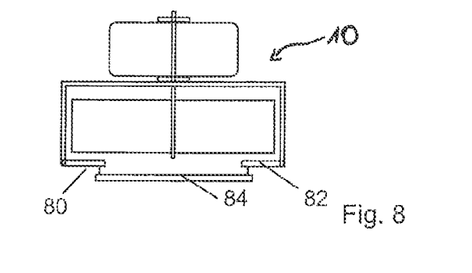
FIG. 8 is an axial sectional view through a vortex attractor having a friction element according to a fifth embodiment.

FIG. 8 shows a longitudinal section through the vortex attractor 10 with a fifth friction element 80 which has an annular element 82 arranged on the edge of the suction opening 40 and a round element 84 arranged axially offset thereto, the external diameter of the round element being greater than the internal diameter of the annular element, and the annular element 82 and the round element 84 are thereby arranged overlapping one another in the radial direction.

Figure 9:
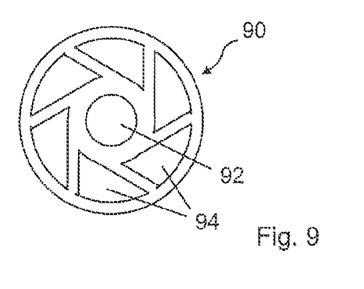
FIG. 9 is a plan view of a friction element according to a sixth embodiment.

FIG. 9 shows a plan view of a sixth friction element 90 which has in a round cover a round centrally arranged recess 92 and six congruent recesses 94 formed in the peripheral region of the cover and delimited by respectively two secants through the suction opening 4 and a circular arc segment around the axis of rotation.

Figure 10:
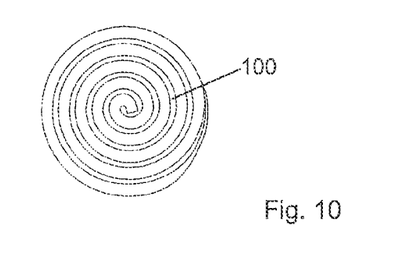
FIG. 10 is a plan view of a friction element according to a seventh embodiment.

FIG. 10 shows a plan view of a seventh friction element 100, configured as a helical winding. This winding can be positioned in the plane of the suction opening 4, in front of or behind said opening 4 or can also be configured three-dimensionally.

Figure 11:
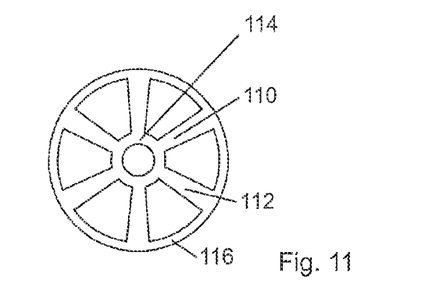
FIG. 11 is a plan view of a friction element according to an eighth embodiment.

FIG. 11 shows a plan view of an eighth friction element 110, having two annular elements 114, 116 which are interconnected by radially running webs 112.

Figures 12, 13, 14, 15:
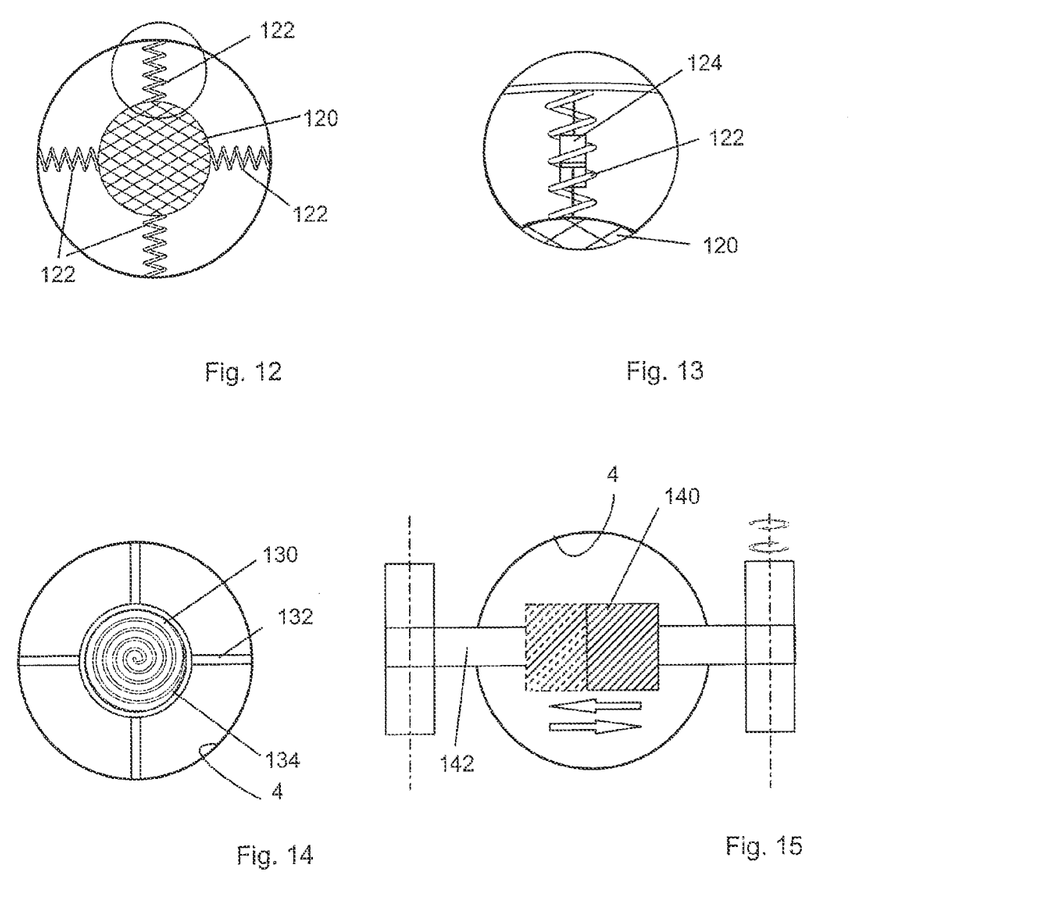
FIG. 12 is a plan view of a friction element according to a ninth embodiment.
FIG. 13 shows an enlargement of a detail from FIG. 12.
FIG. 14 is a plan view of a friction element according to a tenth embodiment.
FIG. 15 is a plan view of a friction element according to an eleventh embodiment.

FIG. 12 shows a plan view of a ninth friction element 120, configured as an element which is arranged centrally in the suction opening 4 and is connected to the edge of the suction opening 4 by a plurality of resilient elements 122. The resilient elements 122 can also have a damping element 124, as shown in FIG. 13.

FIG. 14 shows a plan view of a tenth friction element 130, configured as a spiral spring which is arranged centrally in, behind or in front of the suction opening 4 and, for example, can be arranged with the outer winding on the edge of the suction opening 4 or, as shown in FIG. 14, can be arranged with the outer winding in an annular element 134 connected to the edge of the suction opening 4 by webs 132.

FIG. 15 shows an eleventh friction element 140 which is mounted such that it slides on a rod 142 arranged in front of the suction opening 4 and by which, for example, movements of the object held at the suction opening 4 relative to the suction opening 4 can be compensated.

Figure 16:
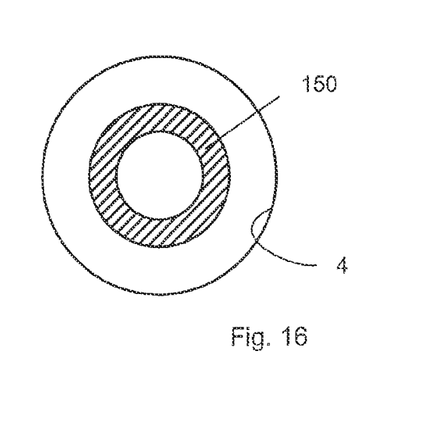
FIG. 16 is a plan view of a friction element according to a twelfth embodiment.

FIG. 16 shows a plan view of a twelfth friction element 150 arranged as an annular element in front of or in the suction opening 4, for example by means of webs or the like.

Figure 26:
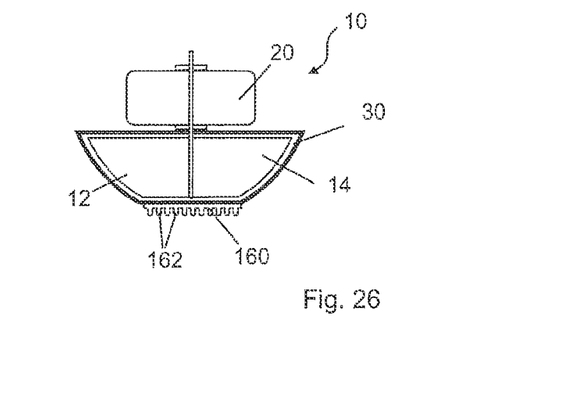
FIG. 26 is a longitudinal sectional view through a vortex attractor having a friction element according to a thirteenth embodiment.
Figure 27A:
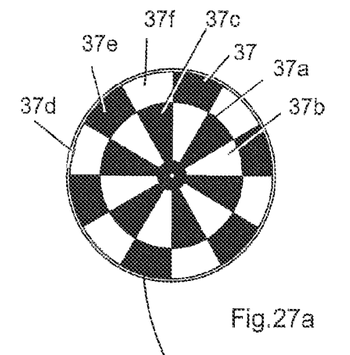
FIG. 27a is a plan view of a screen element according to a further embodiment.
Figure 27B:
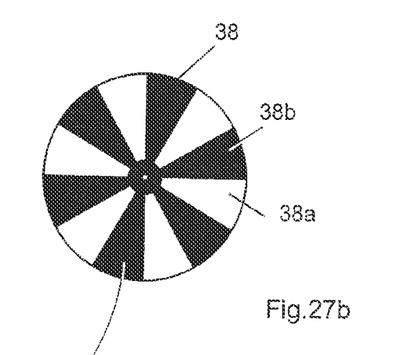
FIG. 27b is a plan view of a screen element according to a further embodiment.
Figure 27C:
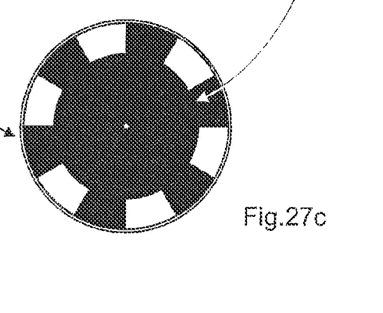
FIG. 27c shows the two screen elements according to FIGS. 27a and 27b superimposed in a first relative position.
Figure 27D:
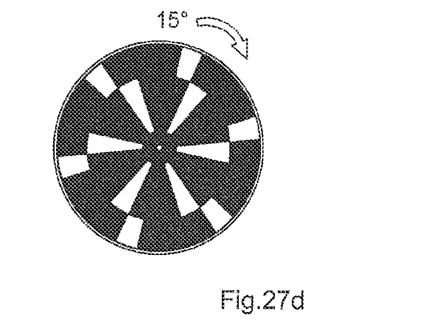
FIG. 27d shows the two screen elements according to FIGS. 27a and 27b in a second relative position.
Figure 27E:
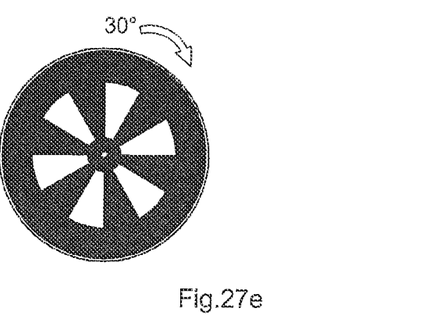

FIG. 26 shows a longitudinal section through a vortex attractor 10, in which the blades 14 of the impeller 12 taper towards the suction opening 4 and, for example, a convex shape in longitudinal section is formed. Arranged in front of the suction opening 4 is a thirteenth friction element 160 which has a three-dimensional structure in the form of knobs 162.

The friction elements 40, 50, 60, 70, 80, 90, 100, 110, 120, 130, 140, 150, 160 should preferably be configured such that they cover less than 60% of the surface of the suction opening 4 to impair as little as possible the low pressure generated by the first means for generating a whirlwind, which first means are configured in particular as impeller 12.

The friction elements 40, 50, 60, 70, 80, 90, 100, 110, 120, 130, 140, 150, 160 have a height which should advantageously be less than 4% of the diameter of the suction opening 4 to impair as little as possible the low pressure generated by impeller 12.

All the friction elements 40, 50, 60, 70, 80, 90, 100, 110, 120, 130, 140, 150, 160 are provided to produce a high friction force between them and the object held by the vortex attractor 10. For this purpose, the friction elements 40, 50, 60, 70, 80, 90, 100, 110, 120, 130, 140, 150, 160 are configured to be resilient for example, they are produced in particular from rubber, they have a rough or structured surface, for example in the form of structural elements, such as ribs, indentations and/or knobs, or can have three-dimensional structures. The structures can be particularly arranged in a pattern or can be arranged in a geometrically regular manner. The friction elements 40, 50, 60, 70, 80, 90, 100, 110, 120, 130, 140, 150, 160 can be configured as a grid or can have undulating structures.

To reduce the surface covered by the friction elements 40, 50, 60, 70, 80, 90, 100, 110, 120, 130, 140, 150, 160, these elements can have a perforated surface or can be produced from an air-permeable material. Each of the friction elements 40, 50, 60, 70, 80, 90, 100, 110, 120, 130, 140, 150, 160 can be arranged variably in its axial spacing to the plane of the suction opening 4 or can have at least one element which can be varied in its axial spacing to the plane of the suction opening 4.

In the following, embodiments of vortex attractors 10 are described which are presented without friction elements and which have second means so that they can vary the generated low pressure. Of course, each of these devices 10 can have one or more of the previously described friction elements 40, 50, 60, 70, 80, 90, 100, 110, 120, 130, 140, 150, 160.

Figure 17:
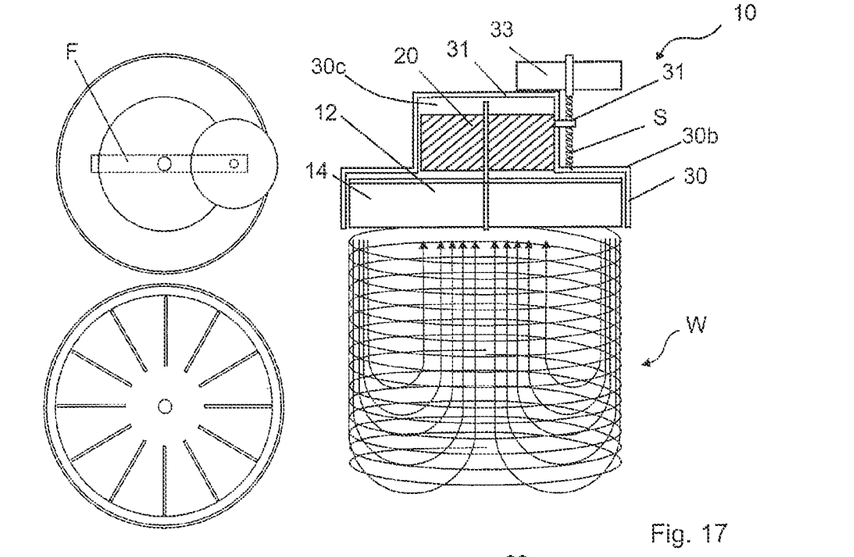
FIG. 17 is a longitudinal sectional view through a vortex attractor according to a further embodiment having an axially displaceable housing with a schematic illustration of the air flows.

FIG. 17 shows an embodiment of the vortex attractor 10 which has a housing 30 with a rear wall 30b, a recess 30c being arranged in the rear wall 30b, into which recess 30c the motor 20 is introduced. The housing 30 can be moved along a shank S relative to the blades 14 of the impeller 12 by a spindle drive 31, in particular by a further motor 33 which can be configured as a stepper motor.

Figure 18:
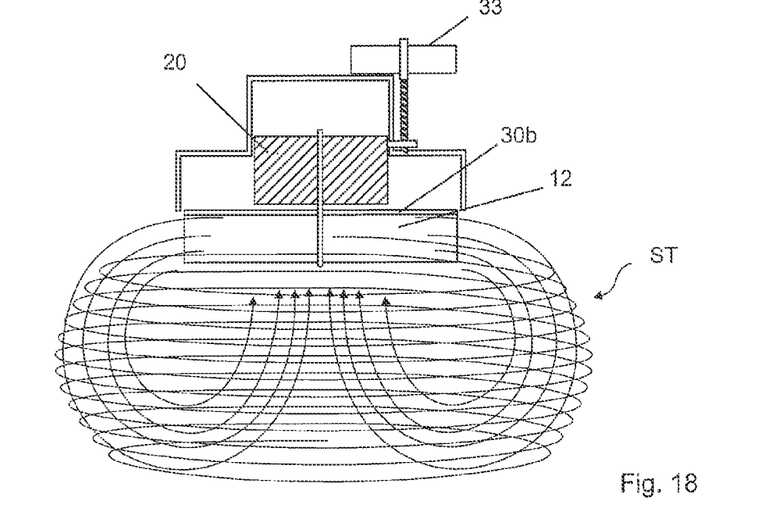
FIG. 18 shows the vortex attractor according to FIG. 17 with the housing in a shifted position and with a schematic illustration of the air flows.
Figure 19:
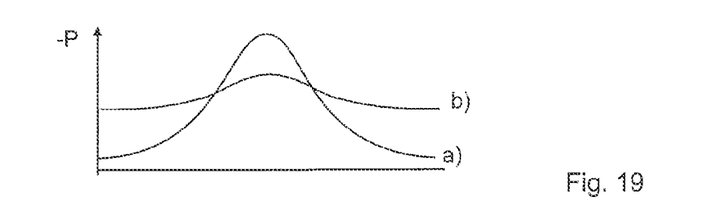
FIG. 19 shows a comparison of the generated low pressures of the device according to FIG. 17 and FIG. 18.

FIG. 17 shows a vortex attractor 10 with the housing 30 in a position in which the housing 30 surrounds the blades 14 of the impeller 12. FIG. 18 shows the vortex attractor 10 according to FIG. 17, in which the housing 30 has been moved upwards along the shank S so that the housing 30 is arranged axially above the blades 14 of the impeller 12. Due to the movement of the housing 30, the direction and absolute intensity of the low pressure of the vortex attractor 10 can be varied, as can be seen in particular in FIG. 19 in which the curve designated by b represents the low pressure of the vortex attractor 10 with the housing 30 in an upwardly shifted position (cf. FIG. 18), whereas the curve designated by a represents the low pressure of the vortex attractor 10 with the housing 30 in a downwardly shifted position (cf. FIG. 17).

Figure 20A:
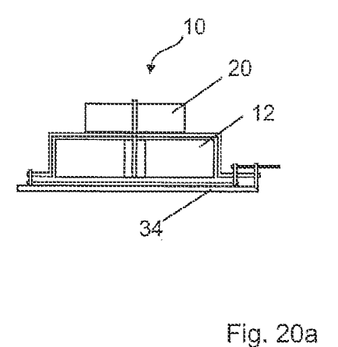
FIG. 20a is a longitudinal sectional view through a vortex attractor with an iris diaphragm.
Figure 20B:
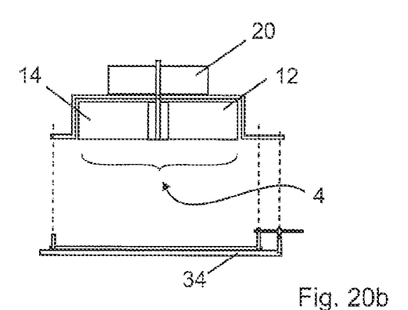
FIG. 20b is an exploded view of the vortex attractor according to FIG. 20a, FIG. 21a is a plan view of the vortex attractor according to FIG. 20a, the iris diaphragm being closed.
Figure 21A:
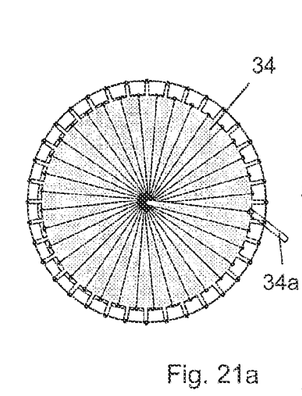
Figure 21B:
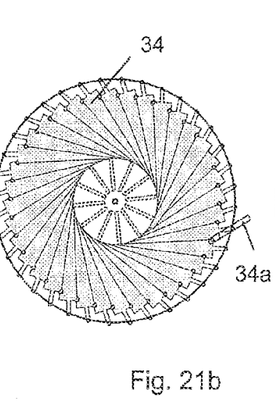
FIG. 21b is a plan view of the vortex attractor according to FIG. 20a, the iris diaphragm being partly open.
Figure 21C:
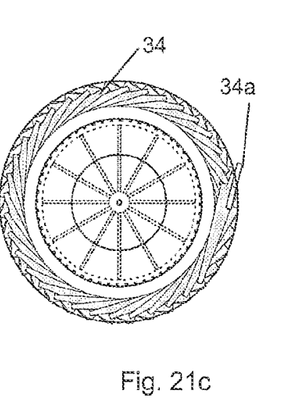
FIG. 21c is a plan view of the vortex attractor according to FIG. 20a, the iris diaphragm being open.
Figure 22A:
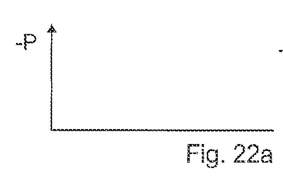
FIG. 22a is an illustration of the low pressure of the vortex attractor according to FIG. 21a, FIG. 22b is an illustration of the low pressure of the vortex attractor according to FIG. 21b.
Figure 22B:
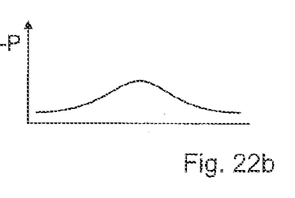
Figure 22C:
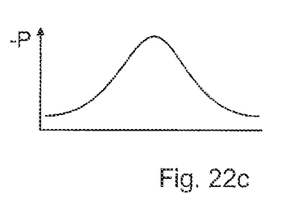
FIG. 22c is an illustration of the low pressure of the vortex attractor according to FIG. 21c.

FIGS. 20 to 22 show a further embodiment of a vortex attractor 10, comprising second means in order to be able to vary the intensity of the low pressure. The vortex attractor 10 has an iris diaphragm 34 which is arranged in front of the suction opening 4 of the vortex attractor 10. The iris diaphragm 34 can be opened and closed by a lever 34a, it being possible for the lever 34a to be actuated either manually or by a motor.

FIG. 21a is a plan view of the vortex attractor 10 according to FIG. 20a, the iris diaphragm 34 being closed. FIG. 21b shows the iris diaphragm 34 in a partly open position and FIG. 21c shows the iris diaphragm 34 in an open position.

FIGS. 22a, 22b and 22c show the low pressure generated by the vortex attractor 10 according to FIG. 20a in the different positions of the iris diaphragm 34, as shown in FIGS. 21a, 21b and 21c.

Figure 23A:
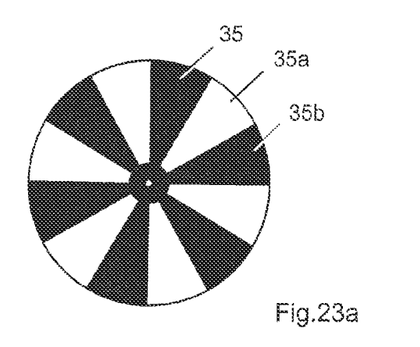
FIG. 23a is a schematic illustration of a screen element according to an embodiment.
Figure 23B:
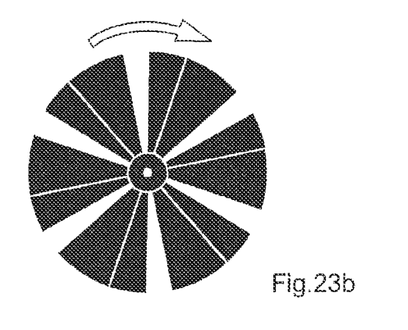
FIG. 23b shows two screen elements, rotatable relative to one another, according to FIG. 23a in a first position.
Figure 23C:
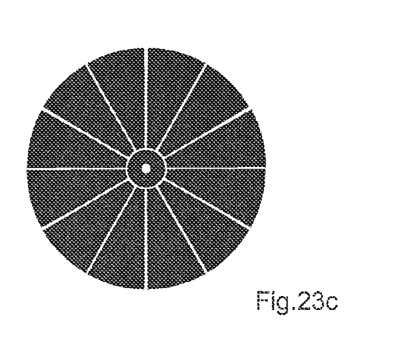
FIG. 23c shows two screen elements according to the embodiment of FIG. 23a in a further position.

FIGS. 23a, 23b and 23c show a further possibility of varying the low pressure generated in front of the suction opening 4. For this purpose, two screen elements 35 are arranged in front of the suction opening 4 such that they can rotate about a common rotational axis which coincides particularly with the rotational axis of the whirlwind. The screen elements 35 have open regions 35a and closed regions 35b which, in the present case, are configured particularly as circular segments and are arranged alternately in the same angular spacing to one another.

FIG. 23a shows the two screen elements 35 in a relative arrangement of this type, in which the closed regions 35b are arranged directly above one another and accordingly the open regions 35a are likewise arranged directly above one another. The suction opening 4 is open as widely as possible in this position of the two screens 35 relative to one another. As shown in FIG. 23b, the two screen elements 35 are rotated relative to one another. The closed regions 35b of one screen element 35 partly cover the open regions 35a of the other screen element 35 and vice versa, so that the open area in front of the suction opening 4 is reduced. As shown in FIG. 23c, the two screen elements 35 are arranged relative to one another such that the closed regions 35b cover the open regions 35a of respectively the other screen element 35, so that the suction opening 4 is completely closed. The low pressure generated in front of the suction opening 4 can be varied thus.

Figure 24A:
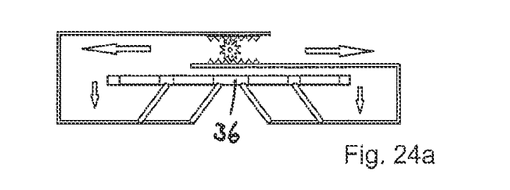
FIG. 24a is a longitudinal sectional view through a screen element according to a further embodiment, illustrated in FIG. 25, in a first position.
Figure 24B:
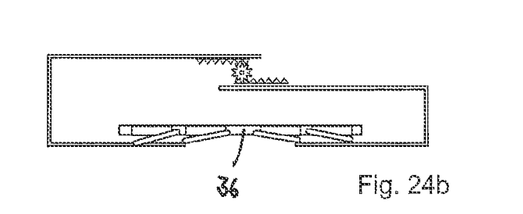
FIG. 24b shows the friction element according to FIG. 24a in a further position.
Figure 25:
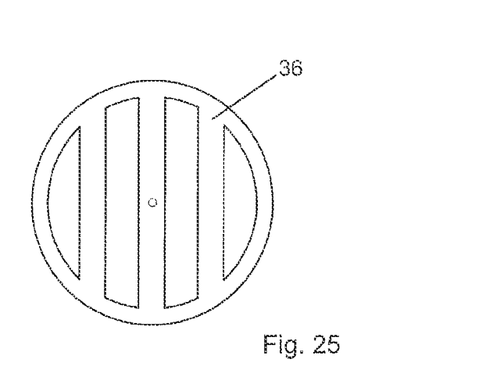
FIG. 25 is a plan view of the screen element according to FIG. 24a and FIG. 24b.

FIGS. 24a, 24b and 25 show a further possibility of varying the low pressure in front of the suction opening 4. For this purpose, a screen element 36 is arranged in front of the suction opening 4, as shown in FIG. 25. The screen element 36 is arranged displaceably in its axial position in front of the suction opening 4. Axial displacement takes place in that two elements coupled together by a toothed wheel are drawn apart, as a result of which the element 36 is moved axially and the air can only flow through the element 36 instead of around element 36, as a result of which the low pressure generated in front of the suction opening 4 is configured to be variable.

FIGS. 27a to 27e show a further possibility of varying the low pressure in front of the suction opening 4. Similarly to the embodiments illustrated in FIGS. 23a to 23c, two screen elements 37, 38 are arranged in front of the suction opening 4 such that they can rotate relative to one another about a common rotational axis. Screen element 38 corresponds to screen element 35 according to FIG. 23a and has open regions 38a and closed regions 38b which are substantially in the shape of circular segments and alternate in the same angular spacing to one another. Screen element 37 has in a circular inner region 37a, the radius of which is smaller than the radius of screen element 37, an analogous configuration with open regions 37b and closed regions 37c which are in the shape of circular segments and alternate in the same angular spacing to one another. In an annular region 37d, adjoining the inner region 37a, closed regions 37e and open regions 37f also alternate in the same angular spacing to one another, but in the ring segment of the annular region 37d, in which a closed region 37c is arranged in the inner region 37a, an open region 37f is arranged in the annular region 37d, while in the ring segments of the annular region 37d in which an open region 37b is arranged in the inner region 37a, a closed region 37e is arranged in the outer annular region 37d. The two screen elements 37 and 38 can be rotated relative to one another. In this respect, one of the two screen elements 37, 38, for example screen element 37 can be arranged rigidly in front of the suction opening 4. When screen element 38 is rotated relative to screen element 37, in one position, the closed regions 38b of screen element 38 come to rest in front of the open regions 37b of the inner region 37a of screen element 37, so that the surface of the inner region 37a in front of the suction opening 4 is completely closed (cf. FIG. 27c), while the closed regions 38b of screen element 38 align in the outer annular region 37d with the closed surfaces 37e of screen element 37, so that open and closed regions alternate in front of the suction opening 4 in the outer annular region 37d (cf. FIG. 27c). In another position, the closed regions 38b of screen element 38 align with the open surfaces 37f of the outer annular region 37d of screen element 37, while the open regions 38a of screen element 38 align with the open regions 37b of the inner region 37a of screen element 37, so that the area in the outer annular region 37d is completely closed in front of the suction opening 4, while in the inner region 37a of the screen element 37 open regions alternate with closed regions in front of the suction opening 4. The low pressure can be varied thus in front of the suction opening 4, since the open or closed proportion of the surface of the suction opening 4 varies. Particularly preferably, this screen structure is used combined with the device 1 described in the following with reference to FIG. 28.

Figure 28:
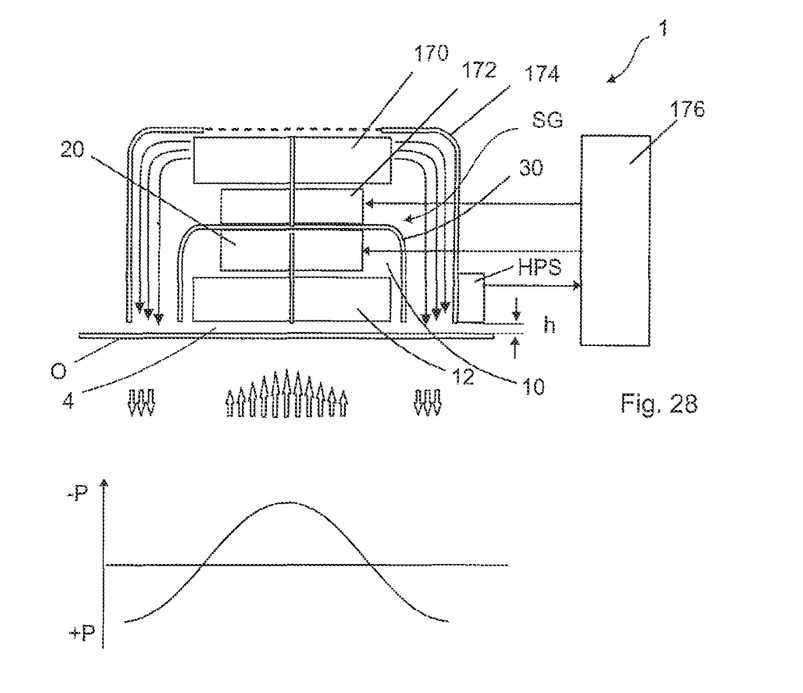

FIG. 28 schematically shows a device 1 with first means 2 for generating a low pressure, which device 1 is configured in particular as a vortex attractor 10 according to one of the previously described embodiments. The vortex attractor 10 is arranged particularly in the housing 30 which is upwardly closed, the motor 20 being arranged axially inside the housing 30 above the impeller 12. In this respect, the motor 20 is arranged in particular on the side of the impeller 12 opposite the suction opening 4. The wall of the housing 30 remote from the suction opening 4 forms a dividing wall from a second impeller 170 which is driven by a motor 172. The motor 172 and the second impeller 170 are arranged axially relative to one another, the motor 172 being arranged adjoining the rear wall of the housing 30. The second impeller 170 and the motor 172 are arranged in a housing 174 which is substantially cylindrical and is preferably oriented coaxially to housing 30 which is also cylindrical. Housing 174 has a greater diameter than housing 30. However, the second impeller 170 has similar dimensions to impeller 12. The second impeller 170 thus generates an air flow which escapes laterally out of the second impeller 170 and emerges concentrically around the suction opening 4 through the annular volume between the outer wall of housing 30 and the inner wall of housing 174 and forms a blowing wind which counteracts the attractive force of the whirlwind generated by impeller 12. With an appropriate control of impeller 170 and of impeller 12, it is possible to keep an object, arranged in front of the suction opening 4, floating in a contactless manner, provided that the attractive force of the whirlwind generated by the first impeller 12 and the repelling force of the blowing wind generated by the second impeller 170 balance each other out. A controller 176 can be provided to activate the impellers 12, 170. As previously described, the strength of the low pressure of impeller 12 or of the repelling force of the second impeller 170 can also be varied by means of the screens 37 and 38, illustrated in FIGS. 27a and 27b.

Figure 29:
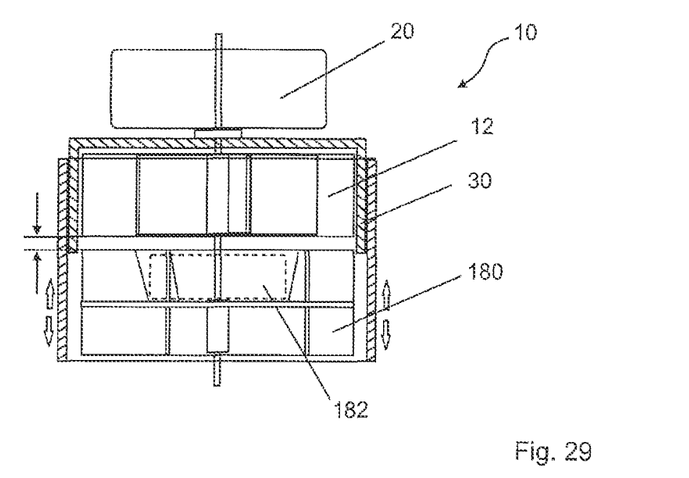

The low pressure, generated in front of the suction opening 4, of impeller 12 is also variable if means are provided to influence the rotational speed of impeller 12 and, for example to instantly stop impeller 12. An embodiment of a vortex attractor 10 of this type is illustrated in FIG. 29. A further impeller 180 which is not driven by a motor but is driven only by the whirlwind generated by impeller 12 is arranged, at an axial distance d and having the same rotational axis, in the housing 30 containing the impeller 12 which is driven by the motor 20 arranged outside the housing 30. The rotational speed of impeller 180 depends on the spacing d between impeller 12 and impeller 180. For this reason, the spacing d between the two impellers 12, 180 is preferably configured to be variable. Impeller 180 has an electromagnetic brake 182 which can instantly stop the rotational movement of impeller 180, which also results in an instant stopping of the rotational movement of impeller 12 and in an abrupt discontinuation in the attractive force of the vortex attractor 10.

Figure 30A:
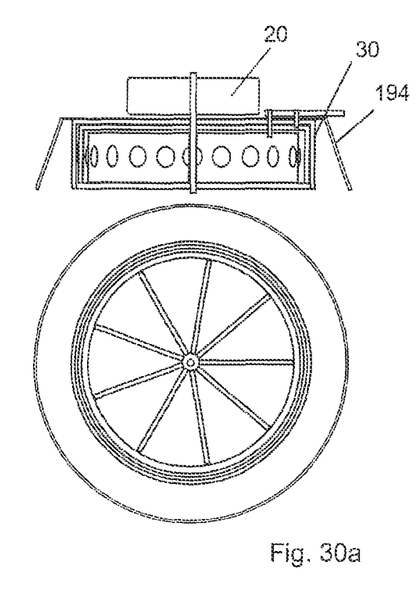
FIG. 30a is a longitudinal sectional view and a plan view of a further embodiment of a device for lifting and positioning an object with first means for generating a low pressure and second means for varying the low pressure in front of the suction opening and being configured as two housings, rotatable relative to one another, with side openings.
Figure 30B:
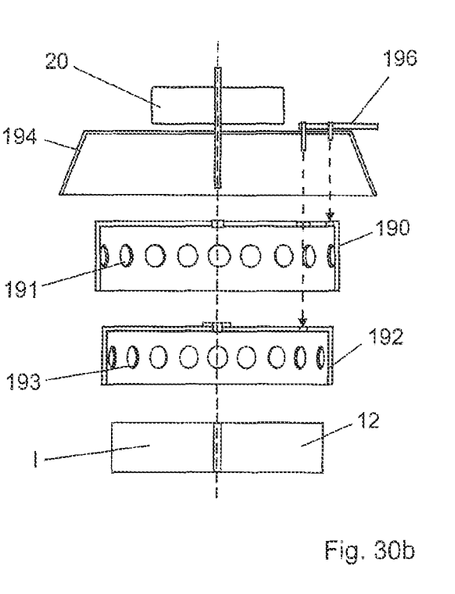
Figure 30C:
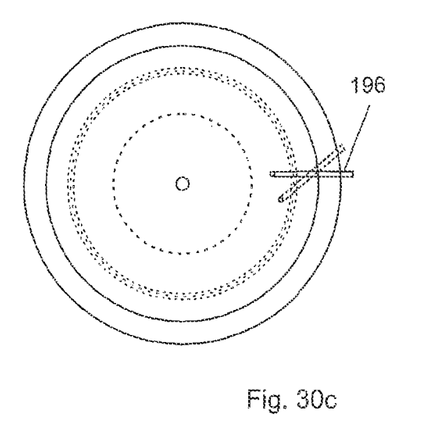

An alternative embodiment to the device 1 which is illustrated in FIG. 28 and can generate both an attractive force and a repelling force is shown in FIGS. 30a to 30c. This device 1 has only one impeller 12 arranged in a housing 30, in the side wall of which are openings which can be at least partly closed. For this purpose, in an embodiment, the housing 30 has two housing parts 190, 192 which can be rotated relative to one another and which have peripheral openings 191, 193 which can either align with one another in one relative position, or can cover one another in another relative position. If the openings 191, 193 cover one another, the housing 30 is substantially closed and impeller 12 generates a whirlwind with maximum attractive force in front of the suction opening 4. If the openings 191, 193 align with one another, the housing 30 has in the side walls openings through which the air flow generated by impeller 12 can pass outwards through the housing 30, where it is deflected towards the suction opening 4 by an outer housing 194, arranged substantially concentrically to housing 30 and being open towards the suction opening 4, but said air flow now functions as a blowing wind and counteracts the low pressure generated by impeller 12. The alignment of the two housing parts 190, 192 can be actuated by a lever 196 manually or controlled by a motor.

Figure 31A:
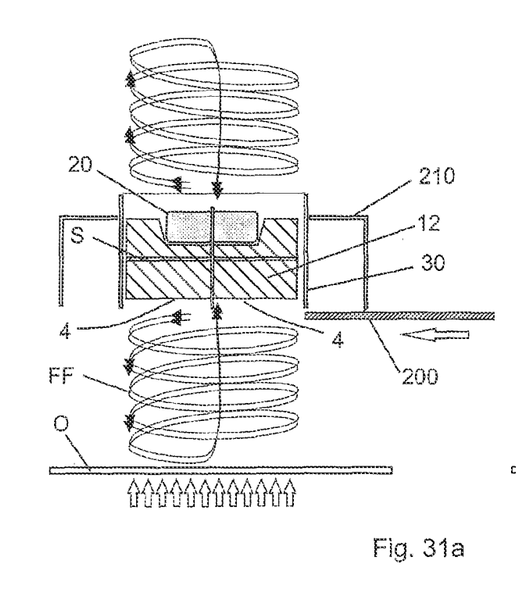
Figure 31B:
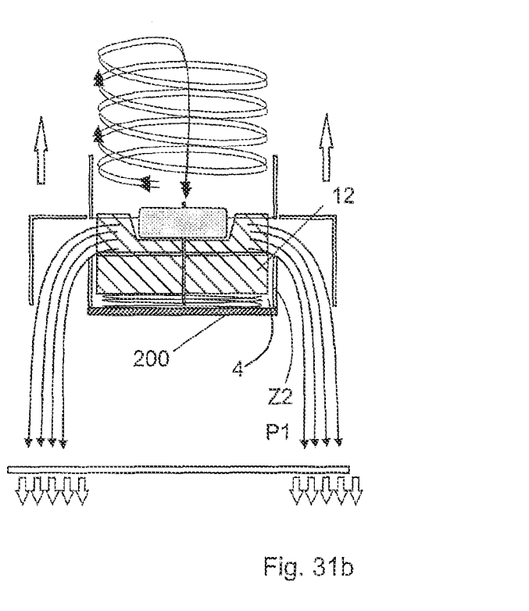
FIG. 31b shows the device according to FIG. 31a with the slide in the closed position.
Figure 31C:
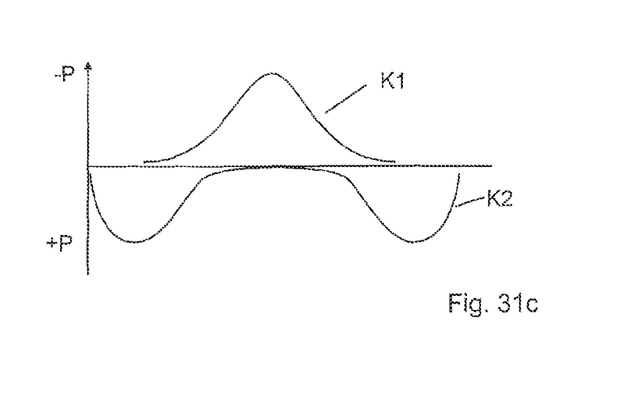
FIG. 31c shows a comparison of the low pressures generated by the devices according to FIGS. 31a and 31b.

A further alternative embodiment of a vortex attractor 10 with second means for varying the low pressure generated by impeller 12 is illustrated in FIGS. 31a to 31c. The suction opening 4 of the vortex attractor 10 can be covered by a slide 200. FIG. 31a shows the slide 200 in the open position in which impeller 12 generates a whirlwind FF which attracts the object O. In FIG. 31b, the slide 200 is closed. At the same time, an opening in the side wall of housing 30 is opened so that impeller 12 generates a blowing wind which escapes through the openings in the side wall of the housing 30, is deflected by an outer housing 210, towards the suction opening 4, concentrically around the suction opening 4 and there exerts a repelling force on the object O. Curve K1 in FIG. 31c shows the pressure exerted on object O when the slide 200 is open, as shown in FIG. 31a, while curve K2 shows the pressure exerted on object O when the slide 200 is closed, as shown in FIG. 31b.

While the invention has been illustrated and described in detail in the drawings and foregoing description, such illustration and description are to be considered illustrative or exemplary and not restrictive. It will be understood that changes and modifications may be made by those of ordinary skill within the scope of the following claims. In particular, the present invention covers further embodiments with any combination of features from different embodiments described above and below. Additionally, statements made herein characterizing the invention refer to an embodiment of the invention and not necessarily all embodiments.

The terms used in the claims should be construed to have the broadest reasonable interpretation consistent with the foregoing description. For example, the use of the article "a" or "the" in introducing an element should not be interpreted as being exclusive of a plurality of elements. Likewise, the recitation of "or" should be interpreted as being inclusive, such that the recitation of "A or B" is not exclusive of "A and B," unless it is clear from the context or the foregoing description that only one of A and B is intended. Further, the recitation of "at least one of A, B and C" should be interpreted as one or more of a group of elements consisting of A, B and C, and should not be interpreted as requiring at least one of each of the listed elements A, B and C, regardless of whether A, B and C are related as categories or otherwise. Moreover, the recitation of "A, B and/or C" or "at least one of A, B or C" should be interpreted as including any singular entity from the listed elements, e.g., A, any subset from the listed elements, e.g., A and B, or the entire list of elements A, B and C.

LIST OF REFERENCE NUMERALS AND SIGNS 1 device
2 first means
3 housing
4 suction opening
5 mechanism
6 control unit
10 vortex attractor
12 impeller
14 blade
16 impeller
18 dividing wall
20 motor
30 housing
30b rear wall
30c recess
31 spindle drive
S shaft
33 motor
34 iris diaphragm
34a lever
35 screen element
35a open region
35b closed region
36 screen element
37 screen element
37a inner region
37b open region
37c closed region
37d annular region
37e closed region
37f open region
38 screen element
38a open region
38b closed region
40 first friction element
42 portions
50 second friction element
52 annular element
54 circular element
60 third friction element
70 fourth friction element
72 annular element
74 annular element
76 circular element
80 fifth friction element
82 annular element
84 circular element
90 sixth friction element
92 circular element
94 elements
100 seventh friction element
110 eighth friction element
112 web
114 ring element
116 ring element
120 ninth friction element
122 resilient element
124 damping element
130 tenth friction element
132 web
134 annular element
140 eleventh friction element
142 rod
150 twelfth friction element
160 thirteenth friction element
162 knobs
170 second impeller
172 motor
174 housing
176 controller
180 impeller
182 electromagnetic brake
190 housing element
191 opening
192 housing element
193 opening
194 outer housing
196 lever
200 slide
210 outer housing

The invention claimed is:

1. A device for lifting and positioning an object, the device comprising:
first means for generating a low pressure by a whirlwind for suctioning the object, the first means being arranged inside a housing having a suction opening, and the housing having at least one friction element having a three-dimensional structure which at least partly covers the suction opening.

2. The device according to claim 1, wherein the friction element covers less than 60% of a surface of the suction opening.

3. The device according to claim 1, wherein the friction element has a height which is less than 4% of a diameter of the suction opening.

4. The device according to claim 1, wherein the friction element is resilient.

5. The device according to claim 1, wherein the friction element is produced from rubber.

6. The device according to claim 1, wherein the friction element has an axially symmetric or point symmetric shape.

7. The device according to claim 1, wherein the friction element is a grid.

8. The device according to claim 1, wherein the friction element has at least one annular element which is arranged concentrically in front of or in the suction opening.

9. The device according to claim 1, wherein the friction element has a round element which is arranged concentrically in or in front of the suction opening.

10. The device according to claim 1, wherein the friction element is configured to undulate and has concentric undulations.

11. The device according to claim 1, wherein the friction element has structural elements including at least one of ribs, indentations and knobs that are arranged in a pattern.

12. The device according to claim 1, wherein the friction element has a perforated surface.

13. The device according to claim 1, wherein the friction element is produced from at least two different materials having at least one of different friction coefficients, different surface structures, different patterns and different transmittances.

14. The device according to claim 1, wherein two friction elements are provided, at least one of the two friction elements having a variable position along a longitudinal axis of the whirlwind.

15. The device according to claim 1, wherein the friction element has an annular element and a round element, the annular element being arranged axially offset relative to the round element in a direction of a longitudinal axis of the whirlwind.

16. The device according to claim 15, wherein the annular element and the round element are arranged such that they overlap in a radial direction.

17. The device according to claim 1, wherein the friction element is arranged on the housing by means of a resilient element.

18. The device according to claim 1, wherein the friction element is permeable to air.

19. The device according to claim 1, wherein two friction elements are provided, the two friction elements being arranged in a variable manner in at least one of their spacing relative to one another and their spacing relative to the housing.

20. The device according to claim 1, wherein the whirlwind generates a low pressure in front of the suction opening, the device further comprising second means for varying the low pressure in front of the suction opening.

21. The device according to claim 20, wherein the second means at least partly cover the suction opening and are configured as a slide or as an iris diaphragm.

22. The device according to claim 20, wherein the second means have a first element with open and closed surfaces and a second element with open and closed surfaces which are arranged relative to one another in front of the suction opening such that, depending on a relative position of the first element and of the second element, a covered surface of the suction opening is variable.

23. The device according to claim 20, Wherein the second means are configured as a brake for the first means.

24. The device according to claim 20, wherein the first means include a first impeller and the second means are include a second impeller, the second impeller being arranged coaxially to the first impeller, the first impeller being driven by a motor and the second impeller having an electromagnetic brake.

25. The device according to claim 20, wherein the second means are configured to generate a blowing wind which counteracts the whirlwind.

26. The device according to claim 20, wherein the first means include a first impeller and the second means include a second impeller, the second impeller being arranged coaxially to the first impeller on a side of the first impeller opposite the suction opening, a dividing wall being arranged between the first impeller and the second impeller, a housing being arranged around the second impeller Which is concentric to the housing of the first impeller and has a greater diameter than the housing of the first impeller.

27. The device according to claim 1, wherein the first means include a first impeller.

28. The device according to claim 27, wherein the first impeller has an impeller wheel and an impeller housing, the impeller wheel being movable relative to the impeller housing in a direction of a rotational axis of the first impeller.

29. The device according to claim 1, further comprising a controller configured to control the first means.

* * * * *